(12) United States Patent
Shimizu et al.

(10) Patent No.: US 10,960,842 B2
(45) Date of Patent: Mar. 30, 2021

(54) CURTAIN AIRBAG DEVICE

(71) Applicant: AUTOLIV DEVELOPMENT AB, Vargarda (SE)

(72) Inventors: Takayuki Shimizu, Kanagawa (JP); Mitsuo Nogami, Kanagawa (JP); Kazuya Tamura, Kanagawa (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 174 days.

(21) Appl. No.: 16/306,765

(22) PCT Filed: May 17, 2017

(86) PCT No.: PCT/JP2017/018447
§ 371 (c)(1),
(2) Date: Dec. 3, 2018

(87) PCT Pub. No.: WO2017/208811
PCT Pub. Date: Dec. 7, 2017

(65) Prior Publication Data
US 2019/0126879 A1 May 2, 2019

(30) Foreign Application Priority Data

Jun. 3, 2016 (JP) .............................. JP2016-111804
Dec. 16, 2016 (JP) .............................. JP2016-243931

(51) Int. Cl.
*B60R 21/213* (2011.01)
*B60R 21/2338* (2011.01)
(Continued)

(52) U.S. Cl.
CPC .......... *B60R 21/213* (2013.01); *B60R 21/232* (2013.01); *B60R 21/2338* (2013.01);
(Continued)

(58) Field of Classification Search
CPC ................ B60R 21/232; B60R 21/214; B60R 2021/23386
See application file for complete search history.

(56) References Cited

U.S. PATENT DOCUMENTS 6,945,558 B2 * 9/2005 Hall ...................... B60R 21/232
280/730.2
7,322,600 B2 * 1/2008 Inoue .................... B60R 21/232
280/730.2
(Continued)

FOREIGN PATENT DOCUMENTS

CN 103269913 A 8/2013
DE 10 2010 056 342 A1 7/2012
(Continued)

OTHER PUBLICATIONS

International Search Report of PCT/JP2017/018447 dated Jul. 25, 2017.

*Primary Examiner* — Nicole T Verley
(74) *Attorney, Agent, or Firm* — Dickinson Wright PLLC

(57) ABSTRACT

A curtain airbag device with which the position of a tether that pulls an end chamber during inflation and deployment thereof can be stabilized, thereby stabilizing the deployment behavior of the end chamber. A curtain airbag device 100 is housed in a side face upper portion of a vehicle cabin and inflated and deployed along the side face, and includes a main chamber 132 that is inflated and deployed using gas from an inflator 122, an end chamber 134 that is disposed on a front end 136 of the main chamber and inflated and deployed by gas received from the main chamber, a tab 144 attached to an upper portion of the main chamber, a bracket 128 fixed to the side face upper portion of the vehicle cabin, the tab being passed through the bracket, and a tether 126 attached so as to extend from a front end 138 of an upper portion of the end chamber to the bracket, wherein a length (Continued)

SEEN FROM DIRECTION OF ARROW A

La of the tether is shorter than a distance Lb from the front end of the upper portion of the end chamber to the bracket in a case where the main chamber and the end chamber are inflated and deployed without the tether.

17 Claims, 16 Drawing Sheets

(51) Int. Cl.
*B60R 21/232* (2011.01)
*B60R 21/231* (2011.01)
(52) U.S. Cl.
CPC ............... *B60R 21/23138* (2013.01); *B60R 2021/23386* (2013.01)

(56) References Cited

U.S. PATENT DOCUMENTS

| | | | |
|---|---|---|---|
| 7,523,958 B2* | 4/2009 | Jang | B60R 21/213 24/289 |
| 7,628,421 B2* | 12/2009 | Wright | B60R 21/232 280/730.2 |
| 7,712,773 B2* | 5/2010 | Walston | B60R 21/08 280/730.2 |
| 7,735,863 B2* | 6/2010 | Walston | B60R 21/08 280/749 |
| 7,823,922 B2* | 11/2010 | Mitchell | B60R 21/232 280/743.2 |
| 8,056,924 B2* | 11/2011 | Hatfield | B60R 21/201 280/730.2 |
| 8,636,301 B1 | 1/2014 | Wang et al. | |
| 8,998,250 B2 | 4/2015 | Kruse et al. | |
| 9,487,180 B2 | 11/2016 | Nakashima | |
| 9,789,837 B2* | 10/2017 | Ma | B60R 21/213 |
| 2003/0132624 A1* | 7/2003 | Hall | B60R 21/232 280/743.1 |
| 2006/0202451 A1* | 9/2006 | Nakanishi | B60R 21/201 280/730.2 |
| 2012/0056054 A1* | 3/2012 | Glockler | B60R 21/20 248/224.8 |
| 2020/0282945 A1* | 9/2020 | McKeon | B60R 21/232 |

FOREIGN PATENT DOCUMENTS

| | | |
|---|---|---|
| EP | 2 658 748 B1 | 9/2016 |
| EP | 2 988 975 B1 | 6/2018 |
| JP | 2013-173403 A | 9/2013 |
| JP | 2014-501205 A | 1/2014 |
| JP | 2016-509977 A | 4/2016 |
| JP | 6101555 B2 * | 3/2017 |
| JP | 6225179 B2 | 11/2017 |
| JP | 6293651 B2 * | 3/2018 |
| KR | 10 2013 0097226 A | 9/2013 |
| WO | Wo 2012/091656 A1 | 7/2012 |
| WO | WP 2014/149187 A1 | 9/2014 |
| WO | WO 2014/188922 A1 | 11/2014 |

* cited by examiner

SEEN FROM DIRECTION OF ARROW A

CURTAIN AIRBAG DEVICE

CROSS-REFERENCE TO RELATED APPLICATIONS

This application is a 35 U.S.C. § 371 national phase of PCT International Application No. PCT/JP2017/018447, filed May 17, 2017, which claims the benefit of priority under 35 U.S.C. § 119 to Japanese Patent Application No. 2016-111804, filed Jun. 3, 2016, and Japanese Patent Application No. 2016-243931, filed Dec. 16, 2016, the contents of which are incorporated herein by reference in their entirety.

FIELD OF THE INVENTION

The present invention relates to a curtain airbag device that is housed in a side face upper portion of a vehicle cabin and inflated and deployed along the side face with the aim of protecting an occupant when the vehicle crashes side-on or rolls over.

BACKGROUND

In recent years, airbag devices are substantially standard features in vehicles. An airbag device is a safety device activated during an emergency such as a vehicle collision, in which a cushion is inflated and deployed by gas pressure in order to receive and protect an occupant. A curtain airbag device, for example, is disposed in a side face upper portion of a vehicle cabin, and is inflated and deployed along a side window, for example, of the vehicle when an impact is generated in order to protect the occupant from an impact generated during a side-on collision or the like. The cushion, which serves as an inflation region of the curtain airbag device, is divided into a plurality of small chambers with the aim of facilitating gas flow and so on.

A curtain airbag device to which technology (Wrap-around IC technology) corresponding to the OMDB (Oblique Moving Deformable Barrier) test has been applied, the OMDB test being an evaluation test prescribed by the NHTSA (National Highway Traffic Safety Administration), is known in the prior art Japanese Publication No. 2016-509977A, for example.

The curtain airbag device described in Japanese Publication No. 2016-509977A restrains and protects the head of a moving occupant during a collision by being configured such that an end chamber of a cushion, which is disposed on a front end of a main chamber of the cushion, is pulled by a tether so as to bend toward the vehicle inner side when the cushion is inflated and deployed.

In the above-cited reference, a tab attached to an upper portion of the main chamber is fixed to the side face upper portion of the vehicle cabin, and the tether is attached so as to extend from a predetermined location on the upper portion of the end chamber to the fixing location of the tab. In the case envisaged here, a structure in which the tab is passed through a bracket fixed to the side face upper portion of the vehicle cabin, the tether is attached to a different bracket to this bracket, and the two brackets are fastened together in the aforesaid fixing location is employed.

With this structure, when the end chamber is pulled by the tether during inflation and deployment of the main chamber, the bracket to which the tether is attached may move (rotate) relative to the bracket through which the tab is passed. In this case, the position of the tether that pulls the end chamber varies, making the deployment behavior of the end chamber unstable.

Further, in the upper portion of the cushion, an interval between tabs attached at an interval in a vehicle front-rear direction may be very long due to the layout of the vehicle (for example, attachment positions of an inflator and an assist grip, and so on). In this case, the upper portion of the cushion cannot be fixed to the vehicle over the very long distance in the region between the tabs, and as a result, the deployment behavior of the cushion during inflation and deployment may be unstable in this region. Moreover, this region is not fixed to the vehicle and therefore sags downward to a greater extent than other regions. Accordingly, a location not covered by the cushion may appear in the side face upper portion of the vehicle cabin, and as a result, it may be difficult to receive and protect the head of the occupant sufficiently during a collision.

In consideration of these problems, an object of the present invention is to provide a curtain airbag device with which the position of a tether that pulls an end chamber during inflation and deployment thereof can be stabilized, thereby stabilizing the deployment behavior of the end chamber. Another object of the present invention is to provide a curtain airbag device that can receive and protect the head of an occupant sufficiently during a collision.

SUMMARY AND INTRODUCTORY DESCRIPTION OF THE INVENTION

To solve the problems described above, a representative embodiment of the curtain airbag device according to the present invention is a curtain airbag device that is housed in a side face upper portion of a vehicle cabin and inflated and deployed along the side face, the curtain airbag device including a main chamber that is inflated and deployed using gas from an inflator, an end chamber that is disposed on a front end of the main chamber and inflated and deployed by gas received from the main chamber, a tab attached to an upper portion of the main chamber, a bracket fixed to the side face upper portion of the vehicle cabin, the tab being passed through the bracket, and a tether attached so as to extend from a predetermined location on an upper portion of the end chamber to the bracket, wherein a length of the tether is shorter than a distance from the predetermined location to the bracket in a case where the main chamber and the end chamber are inflated and deployed without the tether.

According to this configuration, the length of the tether is shorter than the distance separating the locations to which the respective ends of the tether are attached, i.e., the predetermined location on the upper portion of the end chamber and the bracket, in a case where the tether is not provided. Therefore, during inflation and deployment of the curtain airbag device, the end chamber is pulled by the tether so as to bend toward the vehicle inner side. When the end chamber bends toward the vehicle inner side, the moving head of the occupant can be restrained by the end chamber during a collision.

A structure in which the tab and the tether are provided in separate brackets and the two brackets are fastened together will now be envisaged. With this embodiment, when the end chamber is pulled by the tether during inflation and deployment of the main chamber, the bracket to which the tether is attached may move (rotate) relative to the bracket through which the tab is passed. In this case, the position of the tether pulling the end chamber varies, and as a result, the deployment behavior of the end chamber becomes unstable.

Hence, in accordance with embodiments of the present invention, the tab and the tether are attached to the same bracket. Accordingly, the bracket fixed to the side face upper portion of the vehicle cabin does not move when the end chamber is pulled by the tether during inflation and deployment of the main chamber, and therefore the position of the tether pulling the end chamber does not vary. As a result, the deployment behavior of the end chamber can be stabilized. Moreover, since the bracket is provided singly, reductions in the number of components and the manufacturing cost and an improvement in the ease of the operation for attaching the bracket can be achieved.

Preferably, the tab and the tether are formed in the shape of strips, and the bracket includes a first through-hole extending in a vehicle front-rear direction, through which the tab is passed, and a second through-hole extending in a vehicle up-down direction, through which the tether is passed.

Here, during inflation and deployment of the main chamber, the tab passed through the first through-hole is pulled toward a vehicle lower side such that the main chamber is suspended therefrom. According to the above configuration, the first through-hole takes a horizontally elongated shape so as to extend in the vehicle front-rear direction and can therefore contact the strip-form tab, which is pulled toward the vehicle lower side, along the vehicle front-rear direction. Hence, force is not exerted locally on the tab, and the tab can be prevented from shifting to one side in the vehicle front-rear direction.

Further, the tether passed through the second through-hole is attached by a leading end thereof to a predetermined location on the upper portion of the end chamber in order to bend the end chamber toward the vehicle inner side during inflation and deployment of the main chamber. In other words, during inflation and deployment of the main chamber, the tether is pulled toward a vehicle front side and the vehicle inner side. According to the above configuration, the second through-hole takes a vertically elongated shape so as to extend in the vehicle up-down direction and can therefore contact the strip-form tether, which is pulled toward the vehicle front side and the vehicle inner side, along the vehicle up-down direction. Hence, force is not exerted locally on the tether, and the tether can be prevented from shifting to one side in the vehicle up-down direction.

The second through-hole is preferably provided further toward the end chamber side than a vehicle front-rear direction center of the bracket. Thus, the tether is passed through the second through-hole positioned on the end chamber side of the bracket. Hence, when the tether is pulled toward the vehicle front side and the vehicle inner side during inflation and deployment of the curtain airbag device, impairment of the behavior of the tether such as becoming caught on a part of the bracket can be prevented, and as a result, the deployment behavior of the end chamber can be stabilized.

The second through-hole is preferably provided on an upper side of the first through-hole. Here, when the vehicle crashes, the head of the occupant may behave so as to sink toward the vehicle lower side, thereby approaching the end chamber that is bent toward the vehicle inner side. According to the above configuration, the second through-hole through which the tether is passed is provided on the upper side of the first through-hole. Therefore, during inflation and deployment of the curtain airbag device, the end chamber is also pulled toward a vehicle upper side while being bent by the tether toward the vehicle inner side. As a result, the end chamber can reliably receive of the head of the occupant even when the head of the occupant behaves so as to sink toward the vehicle lower side during a vehicle collision.

Preferably, the bracket includes a flat plate-shaped base and a flat plate-shaped bent portion that is bent from a lower end of the base so as to extend toward a vehicle inner side, the first through-hole is provided in the base, and the second through-hole is provided in the bent portion. Thus, the second through-hole is provided further toward the vehicle lower side and the vehicle inner side than the first through-hole. By providing the second through-hole on the vehicle lower side of the first through-hole in this manner, the size of the bracket in the vehicle front-rear direction can be reduced. Moreover, by providing the second through-hole, through which the tether is passed, on the vehicle inner side of the first through-hole, the tether can be pulled from a location further toward the vehicle inner side, and as a result, the end chamber can be bent toward the vehicle inner side more easily.

The predetermined location is preferably a front end of the upper portion of the end chamber. Thus, during inflation and deployment of the curtain airbag device, the front end of the upper portion of the end chamber is pulled by the tether so that the end chamber bends toward the vehicle inner side. As a result, during a vehicle collision, the end chamber can receive the head of the occupant over the entirety of a region extending from the front end thereof to a boundary between the main chamber and the end chamber.

The predetermined location is preferably the center of the upper portion of the end chamber. Here, when the vehicle crashes diagonally, the head of the occupant may move diagonally forward, or in other words in a direction having a predetermined angle toward the vehicle outer side relative to the vehicle front side. In this case, depending on the predetermined angle, it may be desirable for the end chamber to receive the head of the occupant over a range extending from the center thereof, rather than the front end thereof, to the boundary between the main chamber and the end chamber. According to the above configuration, during inflation and deployment of the curtain airbag device, the end chamber is bent toward the vehicle inner side by having the tether pull the center of the upper portion of the end chamber, and therefore the head of the occupant can be restrained over a range extending from the center to the boundary between the main chamber and the end chamber during a diagonal collision.

The bracket preferably includes a hook that is hooked to the side face upper portion. Thus, the bracket can be fixed to the side face upper portion of the vehicle cabin in a state where the hook is hooked to the side face upper portion. Hence, the bracket does not rotate during inflation and deployment of the curtain airbag device, and as a result, the deployment behavior of the end chamber can be stabilized more reliably.

The curtain airbag device preferably further includes a strap that is attached so as to extend from a front pillar of the vehicle to the boundary between the main chamber and the end chamber along a vehicle outer side of the end chamber. Thus, the strap passes along the vehicle outer side of the end chamber, and therefore, during inflation and deployment of the curtain airbag device, the strap is moved so as to push the end chamber toward the vehicle inner side. As a result, the end chamber contacts the occupant early so that the occupant can be restrained quickly.

To solve the problems described above, another representative embodiment of the curtain airbag device according to the present invention is a curtain airbag device that is housed in a side face upper portion of a vehicle cabin and inflated and deployed along the side face, the curtain airbag device including an airbag cushion that is inflated and deployed using gas from an inflator, a first tab attached to an upper portion of the airbag cushion, and a second tab provided adjacent to the first tab on the upper portion of the airbag cushion at an interval from the first tab in a vehicle front-rear direction, a bracket fixed to the side face upper portion of the vehicle cabin, the first tab being passed through the bracket, and a first tether attached so as to extend from a first predetermined location between the first tab and the second tab on the upper portion of the airbag cushion to the bracket.

Here, when the interval between the first tab and the second tab is very long, the upper portion of the airbag cushion cannot be fixed to the vehicle over the very long distance in the region between the first tab and the second tab. In this region, therefore, the deployment behavior of the airbag cushion during inflation and deployment may be unstable. Moreover, since this region is not fixed to the vehicle, the region sags downward to a greater extent than other regions, and as a result, a location not covered by the airbag cushion may appear in the side face upper portion of the vehicle cabin, making it difficult to receive and protect the head of the occupant sufficiently during a collision.

Hence, the present invention is provided with the bracket through which the first tab is passed and the first tether that is attached so as to extend to the bracket from the first predetermined location between the first tab and the second tab. Thus, during inflation and deployment of the airbag cushion, the first predetermined location is pulled by the first tether attached to the bracket. As a result, downward sagging of the airbag cushion during inflation and deployment can be reduced. Further, when the airbag cushion receives the head of the occupant during a collision, the resulting impact is dispersed by also being transmitted to the bracket via the first tether. As a result, the deployment behavior of the upper portion of the airbag cushion can be stabilized, and the head of the occupant can be received and protected sufficiently during a collision.

The bracket preferably includes a first through-hole extending in the vehicle front-rear direction, through which the first tab is passed, and a second through-hole extending in a vehicle up-down direction, through which the first tether is passed.

Here, during inflation and deployment of the airbag cushion, the first tab passed through the first through-hole is pulled toward the vehicle lower side such that the airbag cushion is suspended therefrom. According to the above configuration, the first through-hole takes a horizontally elongated shape so as to extend in the vehicle front-rear direction and can therefore contact the first tab, which is pulled toward the vehicle lower side, along the vehicle front-rear direction. Hence, force is not exerted locally on the first tab, and the first tab can be prevented from shifting to one side in the vehicle front-rear direction.

Further, the first tether passed through the second through-hole is attached to the first predetermined location on the upper portion of the airbag cushion in order to pull the first predetermined location toward the front/rear of the vehicle and the vehicle upper side during inflation and deployment of the airbag cushion. According to the above configuration, the second through-hole takes a vertically elongated shape so as to extend in the vehicle up-down direction and can therefore contact the first tether, which is pulled from the first predetermined location toward the front/rear of the vehicle and the vehicle lower side, along the vehicle up-down direction. Hence, force is not exerted locally on the first tether, and the first tether can be prevented from shifting to one side in the vehicle up-down direction.

The curtain airbag device preferably further includes a third tab provided at an interval from the first tab in the vehicle front-rear direction on an opposite side to the second tab, and a second tether attached so as to extend from a second predetermined location between the first tab and the third tab on the upper portion of the airbag cushion to the bracket.

In the above configuration, the first tab and the second and third tabs provided at intervals from the first tab in the vehicle front-rear direction on opposite sides thereof are attached to the upper portion of the airbag cushion. Here, when the respective intervals between the first tab and the second tab and between the first tab and the third tab are long, the upper portion of the airbag cushion cannot be fixed to the vehicle over the long distances in the respective regions between the first tab and the second tab and between the first tab and the third tab. In the above configuration, therefore, the two tethers are attached to the bracket. More specifically, the first tether is attached so as to extend to the bracket from the first predetermined location between the first tab and the second tab, and the second tether is attached so as to extend to the bracket from the second predetermined location between the first tab and the third tab. Thus, during inflation and deployment of the airbag cushion, the first predetermined location and the second predetermined location are pulled respectively by the first tether and the second tether attached to the bracket. According to the above configuration, therefore, downward sagging of the airbag cushion during inflation and deployment in the region between the first tab and the second tab and the region between the first tab and the third tab can be reduced.

The bracket preferably includes a first through-hole extending in the vehicle front-rear direction, through which the first tab is passed, a second through-hole extending in a vehicle up-down direction, through which the first tether is passed, and a third through-hole extending in the vehicle up-down direction, through which the second tether is passed. According to this configuration, the first through-hole takes a horizontally elongated shape so as to extend in the vehicle front-rear direction and can therefore contact the first tab, which is pulled toward the vehicle lower side during inflation and deployment of the airbag cushion, along the vehicle front-rear direction. Hence, force is not exerted locally on the tab, and the tab can be prevented from shifting to one side in the vehicle front-rear direction. Further, the first tether and the second tether passed respectively through the second through-hole and the third through-hole are attached respectively to the first predetermined location and the second predetermined location on the upper portion of the airbag cushion so as to pull the first predetermined location and the second predetermined location respectively toward the front/rear of the vehicle and the vehicle upper side during inflation and deployment of the airbag cushion. Moreover, in the above configuration, the second through-hole and the third through-hole take a vertically elongated shape so as to extend in the vehicle up-down direction and can therefore contact the first tether and the second tether, which are pulled from the first predetermined location and the second predetermined location toward the front/rear of the vehicle and the vehicle lower side, along the vehicle up-down direction. Hence, force is not exerted locally on the first and second tethers, and the first and second tethers can be prevented from shifting to one side in the vehicle up-down direction.

Preferably, the second through-hole in the bracket is provided further toward the side of the first predetermined location than a vehicle front-rear direction center of the bracket, and the third through-hole is provided further toward the side of the second predetermined location than the vehicle front-rear direction center of the bracket. Thus, the first tether and the second tether are respectively passed through the second through-hole and the third through-hole positioned in the bracket respectively on the sides of the first predetermined location and the second predetermined location of the upper portion of the airbag cushion. Hence, when the first tether and the second tether are respectively pulled toward the front/rear of the vehicle and the vehicle lower side during inflation and deployment of the airbag cushion, impairment of the behavior of the first and second tethers such as becoming caught on a part of the bracket can be prevented, and as a result, the deployment behavior of the upper portion of the airbag cushion can be stabilized.

The second through-hole and the third through-hole are preferably provided on an upper side of the first through hole. Here, when the vehicle crashes, the head of the occupant may behave so as to sink toward the vehicle lower side relative to the airbag cushion. According to the above configuration, however, the second through-hole through which the first tether is passed and the third through-hole through which the second tether is passed are provided on the upper side of the first through-hole. Therefore, during inflation and deployment of the airbag cushion, the first predetermined location and the second predetermined location are pulled further toward the vehicle upper side by the first tether and the second tether which, by being passed respectively through the second through-hole and the third through-hole provided on the upper side, extend in an almost vertical state. Hence, the airbag cushion can receive the head of the occupant sufficiently even when the head of the occupant behaves so as to sink toward the vehicle lower side relative to the airbag cushion during a vehicle collision.

Preferably, the bracket includes a flat plate-shaped base, a first extension portion extending from the base to the side of the first predetermined location, and a second extension portion extending from the base to the side of the second predetermined location, the first through-hole being provided in the base, the second through-hole being provided in the first extension portion, and the third through-hole being provided in the second extension portion. Thus, the second through-hole and the third through-hole through which the first tether and the second tether are respectively passed are respectively provided further toward the sides of the first predetermined location and the second predetermined location of the upper portion of the airbag cushion than the first through-hole. Accordingly, the first tether and the second tether can pull the first predetermined location and the second predetermined location from locations respectively closer to the first predetermined location and the second predetermined location, and as a result, the deployment behavior of the upper portion of the airbag cushion can be further stabilized.

The bracket preferably includes a hook that is hooked to the side face upper portion. Thus, the bracket can be fixed to the side face upper portion of the vehicle cabin in a state where the hook is hooked to the side face upper portion. Hence, the bracket does not rotate during inflation and deployment of the airbag cushion, and as a result, the deployment behavior of the upper portion of the airbag cushion can be stabilized more reliably.

According to the present invention, it is possible to provide a curtain airbag device with which the position of a tether that pulls an end chamber during inflation and deployment thereof can be stabilized, thereby stabilizing the deployment behavior of the end chamber. Also according to the present invention, it is possible to provide a curtain airbag device that can receive and protect the head of an occupant sufficiently during a collision.

DETAILED DESCRIPTION

Figure 1:
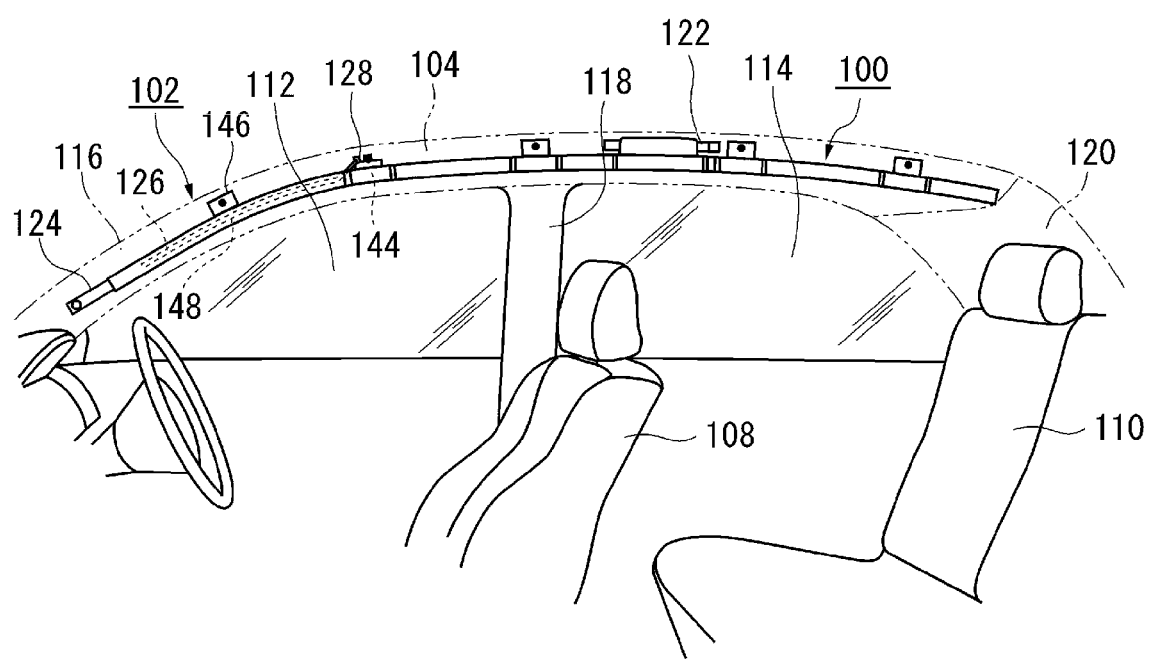
FIG. 1 is a schematic view illustrating a curtain airbag device according to an embodiment of the present invention.

Preferred embodiments of the present invention will be described in detail below with reference to the attached figures. Dimensions, materials, other specific numerical values, and so on indicated in these embodiments are merely examples for facilitating understanding of the invention, and unless specified otherwise, the present invention is not limited thereto. Note that in the description and the figures, elements having substantially identical functions and configurations have been allocated identical reference numerals, and duplicate description thereof has been omitted. Further, elements not directly related to the present invention are not shown in the figures.

Figure 2:
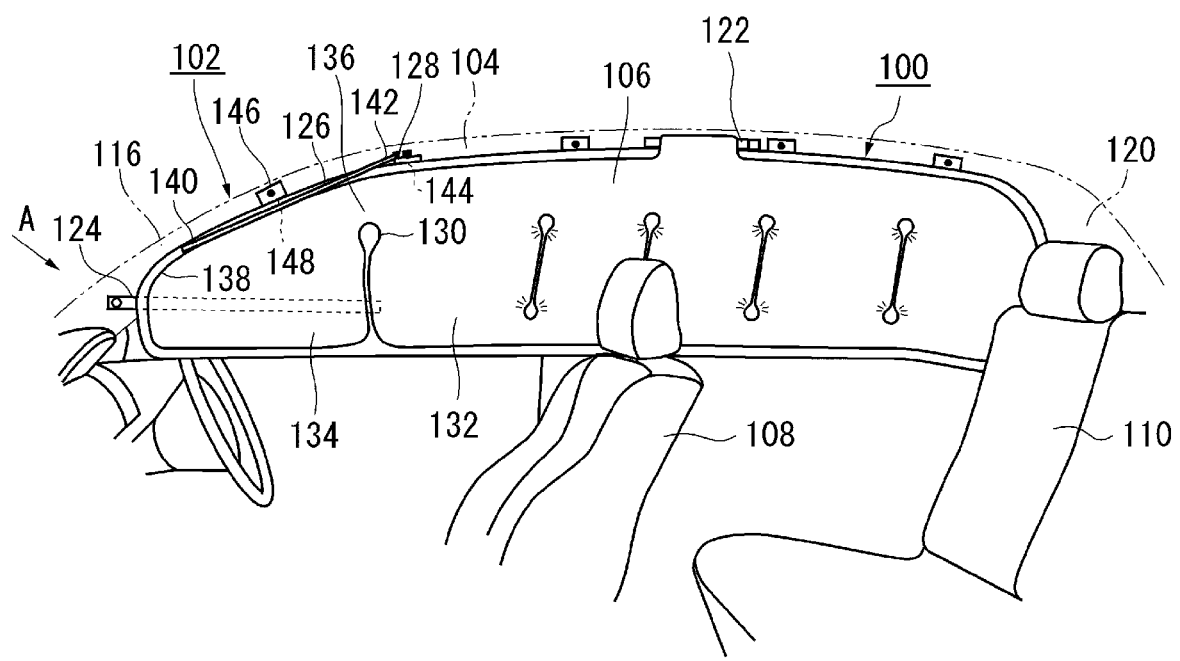
FIG. 2 is a view illustrating the curtain airbag device of FIG. 1 in an inflated and deployed state.

FIG. 1 is a schematic view illustrating a curtain airbag device 100 according to an embodiment of the present invention. FIG. 2 is a view illustrating the curtain airbag device 100 of FIG. 1 in an inflated and deployed state. Note that in the figures, the curtain airbag device 100 is used on the right-hand side face of a vehicle 102, but a left-hand side face curtain airbag not shown in the figures has an identical symmetrical structure.

As shown in FIG. 1, the curtain airbag device 100 is housed by being attached to a roof side rail 104, indicated by an imaginary line, in a side face upper portion of a vehicle cabin in a rolled or folded state. An airbag cushion (a cushion 106 hereafter) of the curtain airbag device 100 shown in FIG. 2 is formed in the shape of a bag by sewing a base fabric forming a surface thereof on the front and rear or by being woven by OPW (One-Piece Woven), for example.

The vehicle 102 is a vehicle with two rows of seats, in which a front seat 108 and a rear seat 110 are arranged in order from the front of the vehicle. Side windows 112, 114 are arranged along a side face of the vehicle 102 in order from the front of the vehicle. Pillars supporting a roof are provided in a vehicle front-rear direction of the side windows. The pillars are connected to the roof side rail 104 and will be referred to, in order from the front of the vehicle 102, as a front pillar 116, a center pillar 118, and a rear pillar 120.

The curtain airbag device 100 includes an inflator 122 serving as a gas generation device, a strap 124, a tether 126, a bracket 128, and the cushion 106, which is shown in FIG. 2. The cushion 106 is inflated and deployed downward by the pressure of gas supplied from the inflator 122 so as to extend along the side windows 112, 114 and so on forming the side face of the cabin, and in so doing protects an occupant.

The cushion 106 is divided into a main chamber 132 and an end chamber 134 by a seam 130, for example. The end chamber 134 is disposed on a front end 136 of the main chamber 132 and serves as a site that is expected to come into contact with the head of the occupant during an emergency. The strap 124 is a string-form member, and as shown in FIG. 2, passes from the front pillar 116 along a vehicle outer side of the end chamber 134 so as to be attached to the seam 130.

The tether 126 is a strip-form member, and as shown in FIG. 2, is attached by a leading end 140 thereof to a predetermined location (here, a front end 138) on the upper portion of the end chamber 134 and attached by a rear end 142 thereof to the bracket 128.

The bracket 128 is a member that is fixed to the side face upper portion (the roof side rail 104, for example) of the vehicle cabin by a bolt or the like, and as well as attaching the tether 126 thereto, a strip-form tab 144 (see FIG. 3) attached to an upper portion of the main chamber 132 is passed therethrough. Note that a bracket 146 other than the bracket 128 is used to attach the cushion 106 to the vehicle 102, for which purpose another tab 148 attached to the upper portion of the cushion 106, the tab 148 being shown representatively in FIG. 2, is passed singly therethrough.

Figure 3:
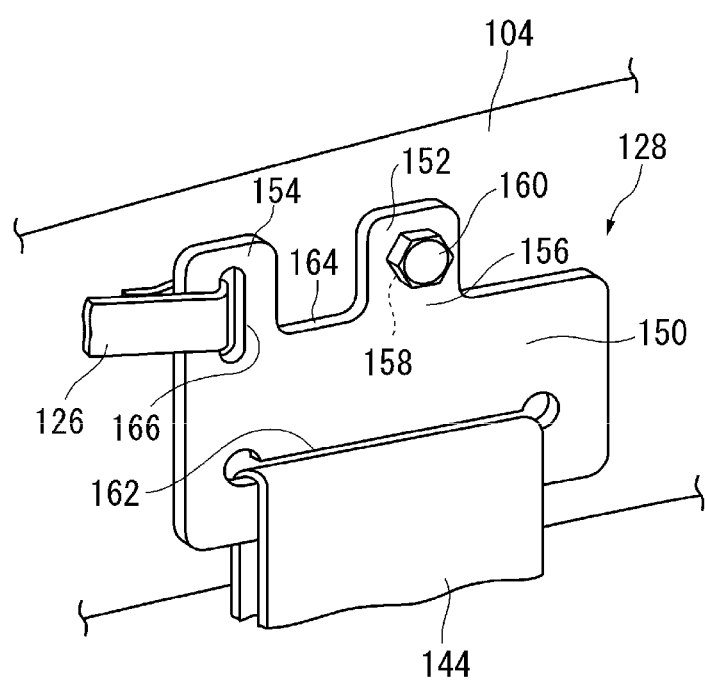
FIG. 3 is a view illustrating a part of the curtain airbag device of FIG. 2.

FIG. 3 is a view illustrating a part of the curtain airbag device 100 of FIG. 2. The figure illustrates the bracket 128 in a state where the tab 144 and the tether 126 are both attached thereto. The bracket 128 is made of metal, for example, and includes a flat plate-shaped base 150, a fixing portion 152, and a projecting portion 154. The fixing portion 152 of the bracket 128 is a site extending upward from a vehicle front-rear direction center 156 of the base 150, and a bolt hole 158 is formed therein. The bracket 128 is fixed non-rotatably to the roof side rail 104 of the vehicle body by screwing a bolt 160 or the like into the bolt hole 158.

A first through-hole 162 is formed in the base 150 of the bracket 128. The first through-hole 162 is a horizontally elongated opening part that extends in the vehicle front-rear direction, and by passing the strip-form tab 144 therethrough, the cushion 106 can be suspended from the tab 144 during inflation and deployment.

The projecting portion 154 of the bracket 128 is a site provided on the vehicle front side of the fixing portion 152 so as to project upward from an upper end 164 of the base 150, and a second through-hole 166 is formed therein. More specifically, the second through-hole 166 is positioned further toward the vehicle front side than the vehicle front-rear direction center 156 of the bracket 128 and further toward the upper side than the first through-hole 162.

Figure 4:
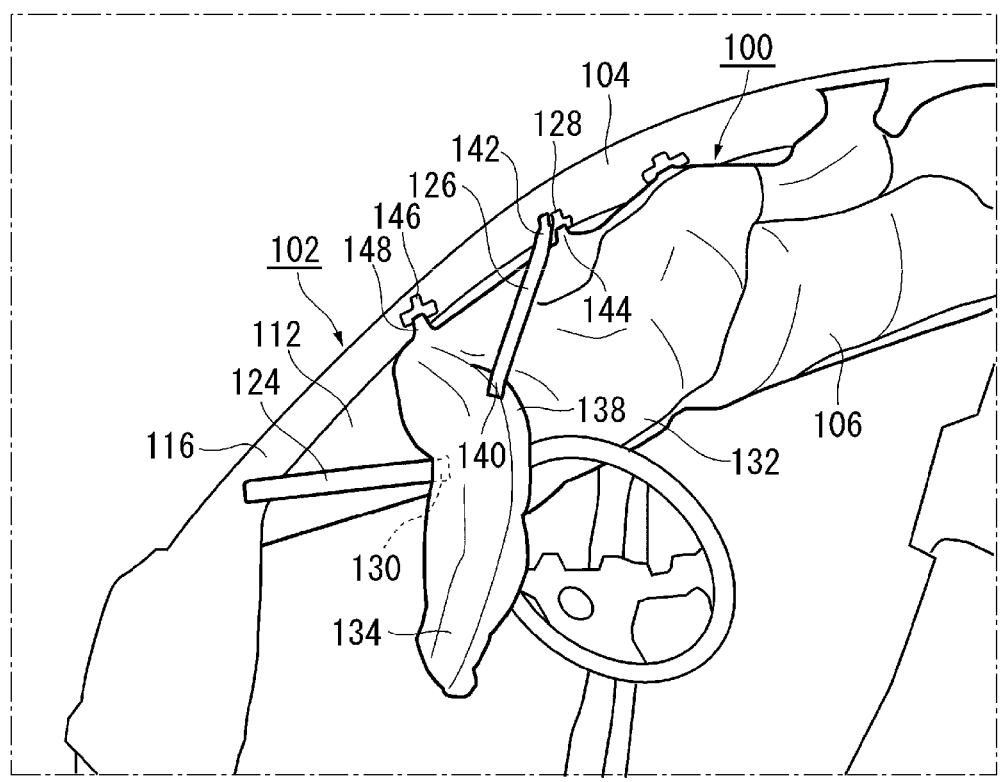
FIG. 4 is a view showing the curtain airbag device of FIG. 2 in the direction of an arrow A.

The second through-hole 166 is a vertically elongated opening part that extends in a vehicle up-down direction, and by passing the strip-form tether 126 through the second through-hole 166, the tether 126 can pull the end chamber 134 toward a vehicle inner side during inflation and deployment using an upper front end 138 of the end chamber 134 as a starting point (see FIG. 4).

Figure 5:
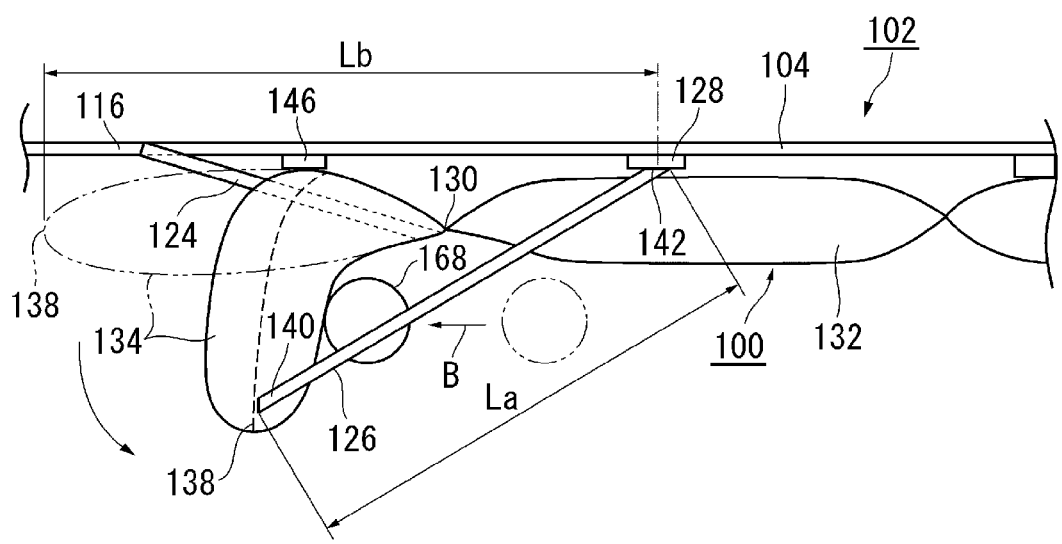
FIG. 5 is a pattern diagram illustrating a state in which the curtain airbag device of FIG. 4 is seen from above.

FIG. 4 is a view showing the curtain airbag device 100 of FIG. 2 in the direction of an arrow A. FIG. 5 is a pattern diagram illustrating a state in which the curtain airbag device 100 of FIG. 4 is seen from above. Note that FIG. 5 shows a state in which a head 168 of an occupant moves toward the vehicle front side as indicated by an arrow B during a collision.

In the curtain airbag device 100, during inflation and deployment, as shown in FIG. 4, the strip-form tab 144 attached to the bracket 128 is pulled toward a vehicle lower side such that the main chamber 132 is suspended therefrom. The other tab 148 attached to the other bracket 146 is also pulled toward the vehicle lower side such that the end chamber 134 is suspended therefrom.

As shown in FIG. 5, a length La of the tether 126 is shorter than a distance Lb from the upper front end 138 of the end chamber 134 to the bracket 128 in a case where the main chamber 132 and the end chamber 134, which is indicated by a two-dot chain line in the figure, are inflated and deployed without the tether 126. In other words, the length La of the tether 126 is shorter than the distance Lb separating the locations to which the two ends of the tether 126, namely the upper front end 138 of the end chamber 134 and the bracket 128, are attached in a case where the tether 126 is not provided. During inflation and deployment, therefore, the tether 126 is pulled toward the vehicle front side and the vehicle inner side so as to extend tautly between the upper front end 138 of the end chamber 134 and the bracket 128, as shown in the figure.

Hence, when the curtain airbag device 100 is inflated and deployed, the upper front end 138 of the end chamber 134 is pulled by the tether 126 so as to bend toward the vehicle inner side. As a result, during a collision, the end chamber 134 can receive and restrain the head 168 of the occupant, which moves in the direction of the arrow B during the collision, as shown in FIG. 5, over the entire region from the front end 138 to the seam 130 serving as the boundary with the main chamber 132.

Further, the strap 124 is attached so as to extend from the front pillar 116 of the vehicle 102 to the seam 130 along the vehicle outer side of the end chamber 134 and is therefore moved so as to push the end chamber 134 out toward the vehicle inner side during inflation and deployment. As a result, the end chamber 134 contacts the occupant early so that the occupant can be restrained quickly.

Figure 6:
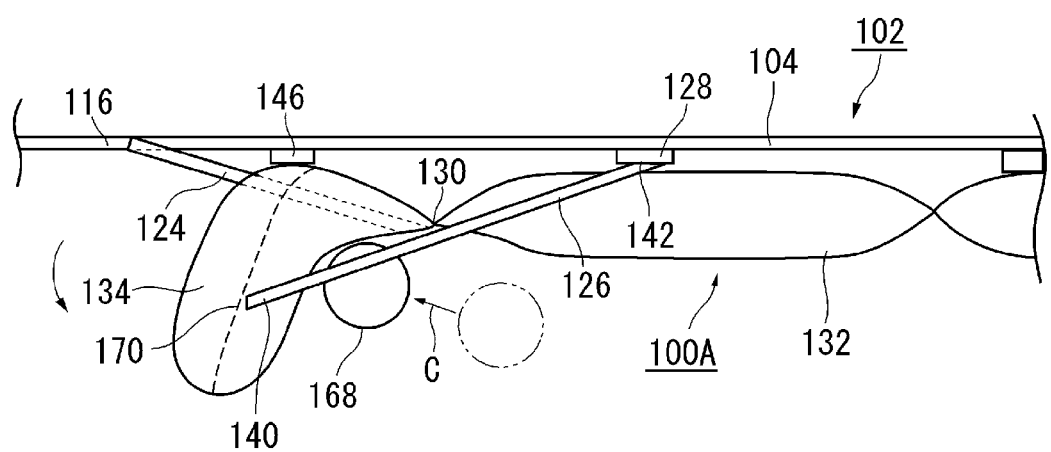
FIG. 6 is a pattern diagram illustrating a state in which a curtain airbag device according to another embodiment is seen from above.

FIG. 6 is a pattern diagram illustrating a state in which a curtain airbag device 100A according to another embodiment is seen from above. Note that the figure shows a state in which the head 168 of the occupant moves diagonally forward, as indicated by an arrow C, during a collision.

The curtain airbag device 100A differs from the curtain airbag device 100 described above in that a leading end 140 of the tether 126 is attached to an intermediate portion 170 serving as the center of the upper portion of the end chamber 134 instead of the upper front end 138. Here, when the vehicle 102 crashes diagonally, the head 168 of the occupant may move diagonally forward, as shown in the figure, or in other words in the direction indicated by the arrow C, which has a predetermined angle toward the vehicle outer side relative to the vehicle front side.

In this case, depending on the predetermined angle, it may be desirable for the end chamber 134 to receive the head 168 of the occupant over a range extending from the upper intermediate portion 170, as shown in the figure, rather than the upper front end 138, as shown in FIG. 5, to the seam 130 serving as the boundary with the main chamber 132.

In the curtain airbag device 100A, envisaging this type of diagonal collision, the upper intermediate portion 170 of the end chamber 134 is pulled by the tether 126 during inflation and deployment so that the end chamber 134 can be bent toward the vehicle inner side. According to the curtain airbag device 100A, therefore, the head 168 of the occupant can be restrained and protected over a range extending from the upper intermediate portion 170 of the end chamber 134 to the seam 130 during a diagonal collision.

Figure 7:
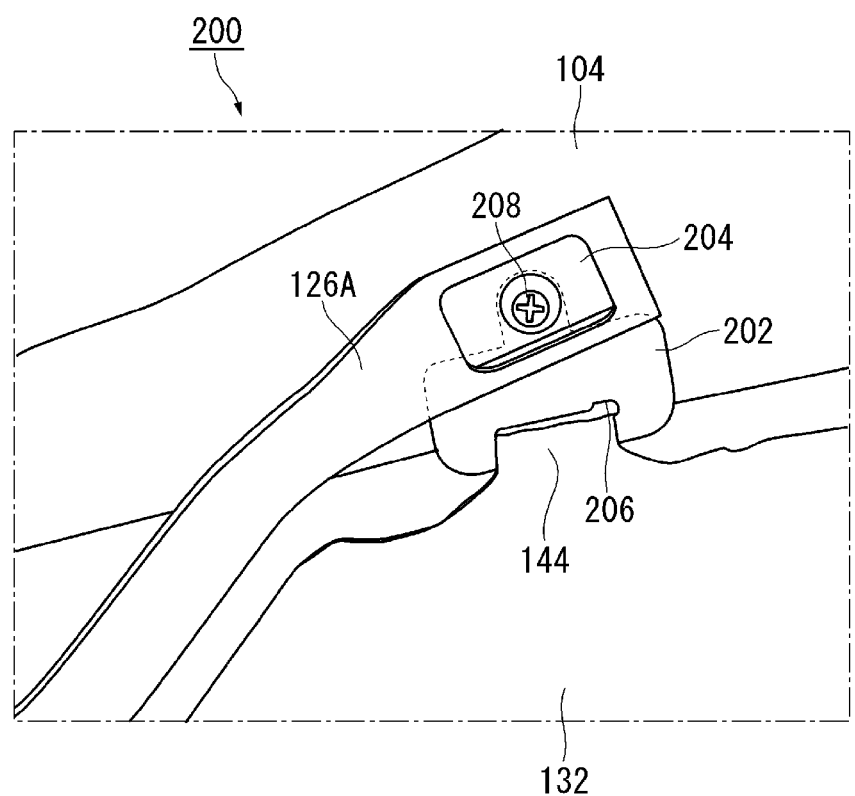
FIG. 7 is a schematic view illustrating a curtain airbag device according to a comparative example.

FIG. 7 is a schematic view illustrating a curtain airbag device 200 according to a comparative example. The curtain airbag device 200 differs from the curtain airbag device 100 in employing a structure in which the tab 144 and a tether 126A are provided on separate brackets 202, 204 and the two brackets 202, 204 are fastened together.

More specifically, the curtain airbag device 200 includes the bracket 202, which is fixed to the roof side rail 104, for example, and through which the tab 144 of the main chamber 132 is passed, and the separate bracket 204 to which the tether 126A is attached. In the curtain airbag device 200, the two brackets 202, 204 are fastened together fixedly by a screw 208 in a state where the tab 144 is passed through a through-hole 206 in the bracket 202 and the tether 126A is provided on the separate bracket 204.

In this curtain airbag device 200, when the end chamber 134 is pulled by the tether 126A during inflation and deployment, the bracket 204 to which the tether 126A is attached may move (rotate) relative to the bracket 202 through which the tab 144 is passed. In this case, the position of the tether 126A that pulls the end chamber 134 varies, making the deployment behavior of the end chamber 134 unstable. Note that variation in the position of the tether 126A means that the tether 126A tilts in an upward direction or a downward direction from an appropriate position.

Hence, in the curtain airbag device 200, the tightening force of the screw 208 or the like that fastens the two brackets 202, 204 together fixedly must be maintained within a predetermined appropriate range to ensure that the position of the tether 126A does not vary.

The curtain airbag device 100 according to this embodiment, on the other hand, is structured such that both the tab 144 and the tether 126 are attached to the same bracket 128. Hence, in the curtain airbag device 100, the bracket 128 does not move even when the end chamber 134 is pulled by the tether 126 during inflation and deployment of the main chamber 132. Accordingly, the position of the tether 126 that pulls the end chamber 134 does not vary, and as a result, the deployment behavior of the end chamber 134 can be stabilized.

Further, with the curtain airbag device 100, through use of the single bracket 128, reductions in the number of components and the manufacturing cost and an improvement in the ease of the operation for attaching the bracket 128 can be achieved.

Furthermore, the first through-hole 162 in the bracket 128 is a horizontally elongated opening part and can therefore contact the strip-form tab 144, which is pulled toward the vehicle lower side during inflation and deployment, along the vehicle front-rear direction. Hence, with the first through-hole 162, force is not exerted locally on the tab 144, and moreover, the tab 144 can be prevented from shifting to one side in the vehicle front-rear direction.

Further, the second through-hole 166 in the bracket 128 is a vertically elongated opening part and can therefore contact the strip-form tether 126, which is pulled toward the vehicle front side and the vehicle inner side during inflation and deployment, along the vehicle up-down direction. Hence, with the second through-hole 166, force is not exerted locally on the tether 126, and moreover, the tether 126 can be prevented from shifting to one side in the vehicle up-down direction.

Furthermore, the second through-hole 166 through which the tether 126 passes is formed in the projecting portion 154 and is therefore provided further toward the end chamber 134 side, or in other words the vehicle front side, than the vehicle front-rear direction center 156 of the bracket 128. Hence, when the tether 126 is pulled toward the vehicle front side and the vehicle inner side during inflation and deployment, the tether 126 does not catch on a part of the bracket 128. Accordingly, impairment of the behavior of the tether 126 can be prevented, and as a result, the deployment behavior of the end chamber 134 can be stabilized.

Moreover, the second through-hole 166 is formed in the projecting portion 154 and therefore provided on the upper side of the first through-hole 162. During inflation and deployment, therefore, the end chamber 134, while being bent toward the vehicle inner side by the tether 126, is also pulled toward the vehicle upper side. As a result, the end chamber 134 can receive, restrain, and protect the head of the occupant reliably even when the head of the occupant behaves so as to sink toward the vehicle lower side during a vehicle collision.

Figure 8:
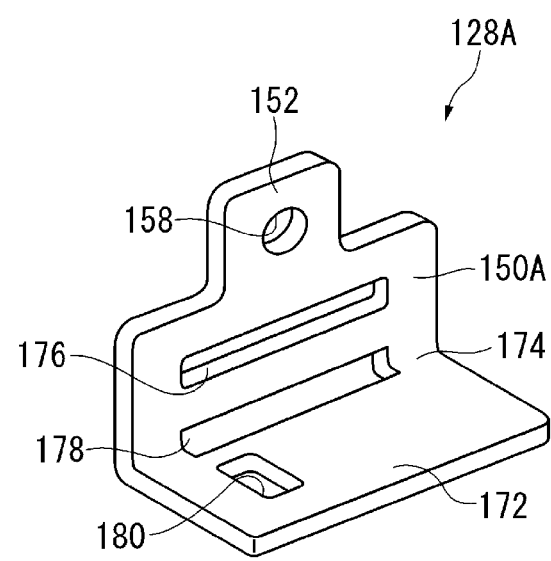
FIG. 8 is a view illustrating a modified example of a bracket shown in FIG. 3.

FIG. 8 is a view illustrating a modified example of the bracket 128 shown in FIG. 3. As shown in the figure, a bracket 128A according to this modified example includes a flat plate-shaped base 150A and a flat plate-shaped bent portion 172. The bent portion 172 is bent from a lower end 174 of the base 150A so as to extend toward the vehicle inner side. Two horizontally elongated first through holes 176, 178 through which the tab 144 is passed are provided in the base 150A. Further, a second through-hole 180 extending in a vehicle width direction, through which the tether 126 is passed, is provided in the bent portion 172.

In the bracket 128A, the second through-hole 180 is provided in the bent portion 172, and therefore the second through-hole 180 is positioned further toward the vehicle lower side and the vehicle inner side than the first through holes 176, 178. According to this modified example, by providing the second through-hole on the vehicle lower side of the first through holes 176, 178, the vehicle front-rear direction size of the bracket 128A can be reduced.

Figure 9:
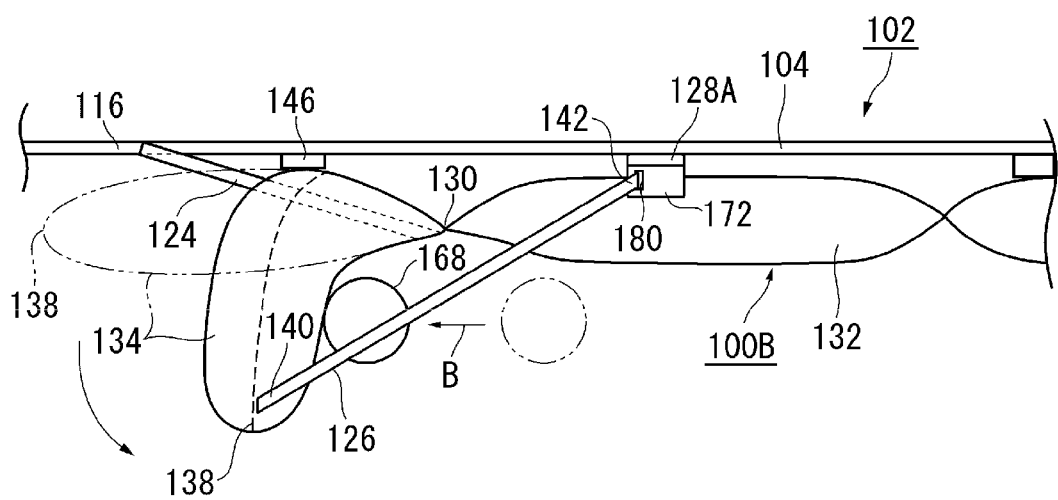
FIG. 9 is a pattern diagram illustrating a state in which a curtain airbag device according to another embodiment, to which the bracket of FIG. 8 is applied, is seen from above.

FIG. 9 is a pattern diagram illustrating a state in which a curtain airbag device 100B according to another embodiment, to which the bracket 128A of FIG. 8 is applied, is seen from above. The curtain airbag device 100B differs from the curtain airbag device 100, described above, in that a rear end 142 of the tether 126 is passed through the second through-hole 180 in the bracket 128A instead of the second through-hole 166 in the bracket 128.

As described above, the second through-hole 180 of the bracket 128A is provided in the bent portion 172 and therefore positioned further toward the vehicle inner side than the first through holes 176, 178. Hence, according to the curtain airbag device 100B, by passing the rear end 142 of the tether 126 through the second through-hole 180, the tether 126 can be pulled from a location further toward the vehicle inner side, and as a result, the end chamber 134 can be bent toward the vehicle inner side more easily.

Figure 10:
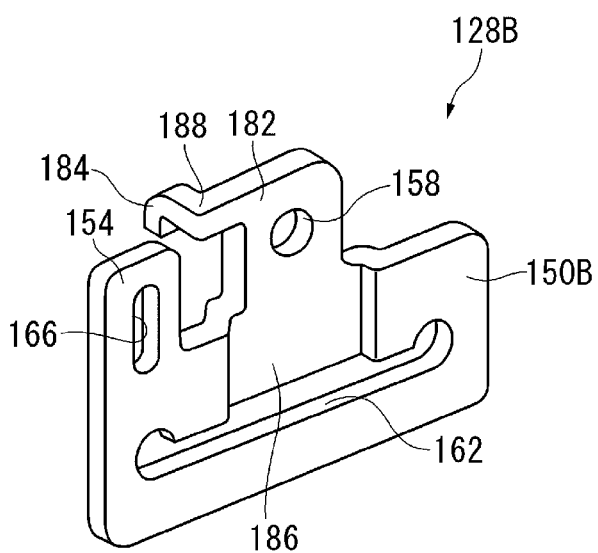
FIG. 10 is a view illustrating another modified example of the bracket shown in FIG. 3.

FIG. 10 is a view illustrating another modified example of the bracket 128 shown in FIG. 3. As shown in the figure, a bracket 128B according to this modified example differs from the bracket 128 described above in that a hook 184 that is hooked to the roof side rail 104, for example, in the side face upper portion of the vehicle cabin is provided on a fixing portion 182 in which the bolt hole 158 is formed.

A base 150B of the bracket 128B is increased in rigidity by being bent toward the vehicle outer side in a center 186 thereof. The fixing portion 182 serves as a site that extends upward from the center 186 of the base 150B. The hook 184 extends from a vehicle front-side end 188 of the fixing portion 182 toward the vehicle outer side and then bends toward the vehicle lower side.

Hence, both the tab 144 and the tether 126 are attached to the bracket 128B, and moreover, the bracket 128B can be fixed to the side face upper portion of the vehicle cabin in a state where the hook 184 is hooked onto the roof side rail 104. Accordingly, the bracket 128B does not rotate during inflation and deployment, and as a result, the deployment behavior of the end chamber 134 can be stabilized more reliably.

Figure 11:
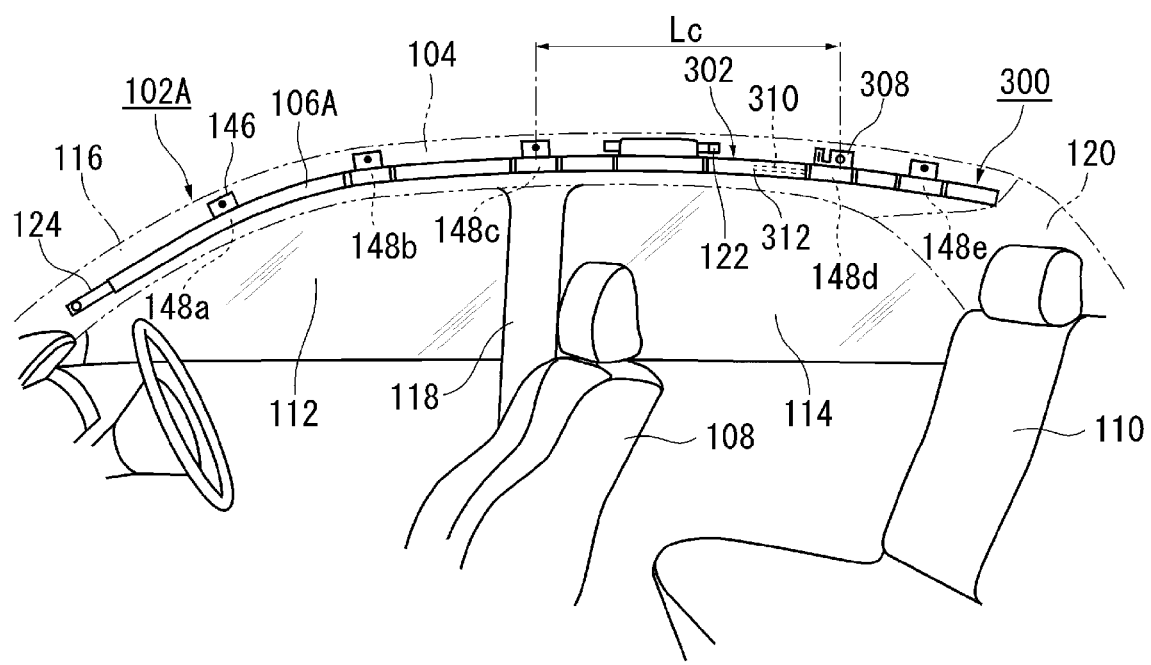
FIG. 11 is a schematic view illustrating a curtain airbag device according to a further embodiment of the present invention.
Figure 12:
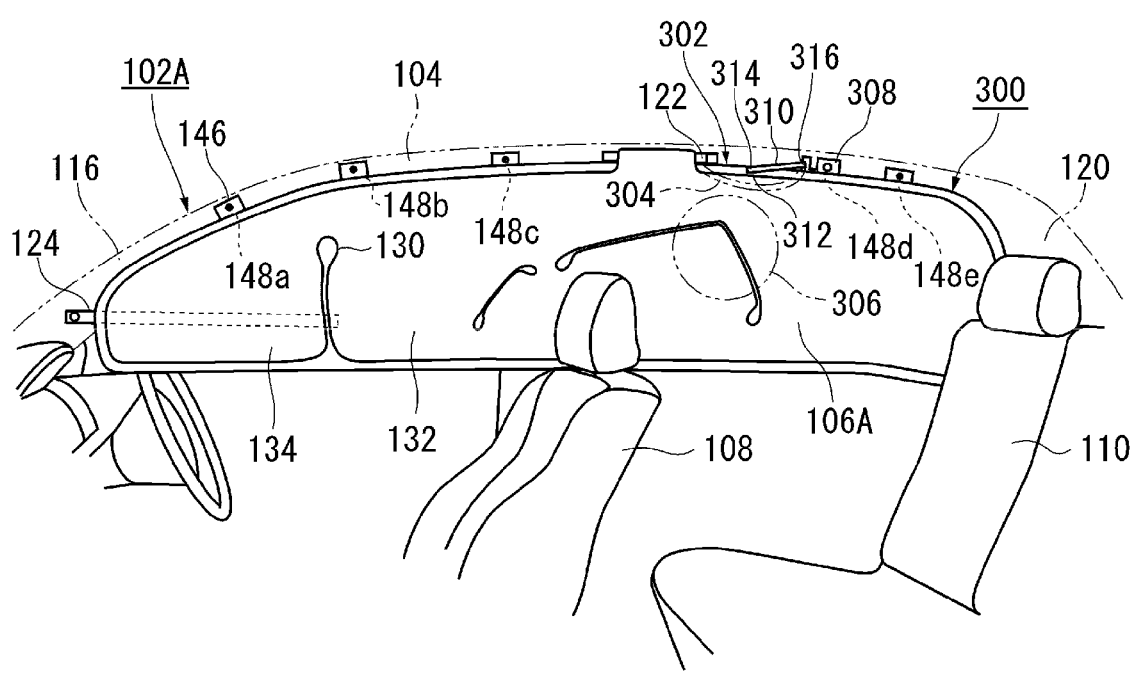
FIG. 12 is a view illustrating the curtain airbag device of FIG. 11 in an inflated and deployed state.

FIG. 11 is a schematic view illustrating a curtain airbag device 300 according to a further embodiment of the present invention. FIG. 12 is a view illustrating the curtain airbag device 300 of FIG. 11 in an inflated and deployed state. Note that the curtain airbag device 300 shown in the figures is for use on the right-hand side face of a vehicle 102A, but a left-hand side face curtain airbag not shown in the figures has an identical symmetrical structure.

The curtain airbag device 300 includes a cushion 106A. As shown in the figures, a plurality of tabs 148a to 148e are attached to an upper portion of the cushion 106A at intervals in the vehicle front-rear direction. Due to the layout of the vehicle 102A, for example attachment positions of the inflator 122 and an assist grip, and so on, the intervals between the adjacent tabs 148a to 148e may not be constant.

Here, as shown in FIG. 11, an interval Lc between adjacent tabs 148c (a second tab) and 148d (a first tab) is the longest of the intervals between the adjacent tabs 148a to 148e. In this case, the upper portion of the cushion 106A cannot be fixed to the vehicle 102A across the very long interval Lc in a region 302 between the tabs 148c, 148d.

As a result, during inflation and deployment of the cushion 106A, the deployment behavior in the region 302 of the upper portion is unstable. Moreover, the region 302 is not fixed to the vehicle 102A and therefore sags downward, as shown by an imaginary line 304 in FIG. 12. Accordingly, a location not covered by the cushion 106A may appear in the side face upper portion of the vehicle cabin, and it is therefore difficult to receive and protect a head 306 (an imaginary line in the figure) of an occupant sufficiently in the region 302 during a collision.

Hence, the curtain airbag device 300 is provided with a bracket 308 through which the tab 148d, among the tabs 148c, 148d defining the region 302, is passed, and a tether 310 (a first tether). As shown in FIG. 12, the tether 310 is attached so as to extend from a predetermined location 312 (a first predetermined location) positioned within the region 302 to the bracket 308.

The tether 310 is a strip-form member, and as shown in FIG. 12, is attached by a leading end 314 thereof to the predetermined location 312 in the region 302 in the upper portion of the cushion 106A and by a rear end 316 thereof to the bracket 308. Note that the other bracket 146 illustrated representatively in the figure is used to attach the cushion 106A to the vehicle 102A, for which purpose only the other tabs 148a, 148b, 148c, and 148e are passed therethrough.

Figure 13:
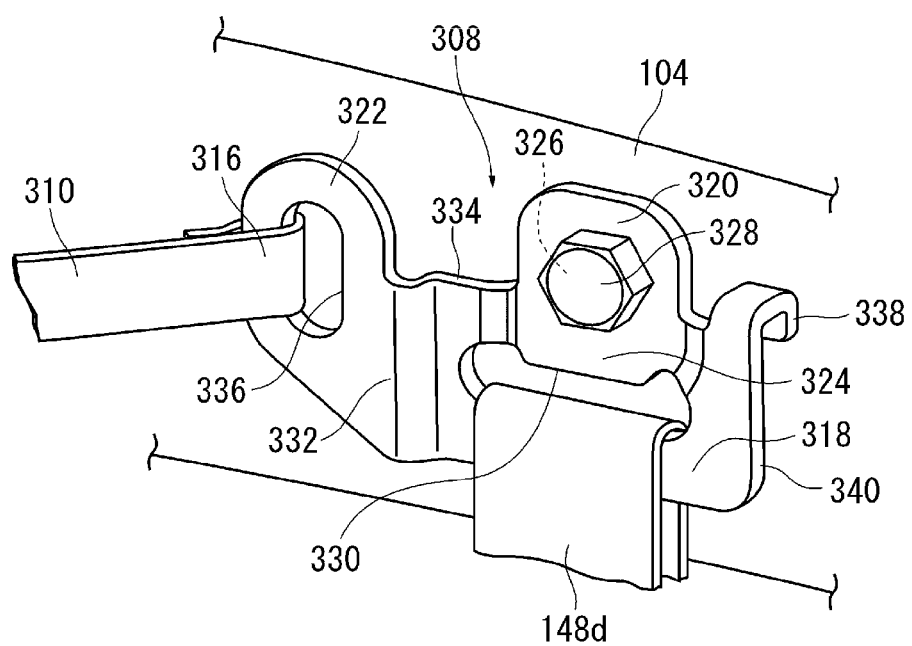
FIG. 13 is a view illustrating a part of the curtain airbag device of FIG. 12.

FIG. 13 is a view illustrating a part of the curtain airbag device 300 of FIG. 12. The figure illustrates the bracket 308 in a state where the tab 148d and the tether 310 are both attached thereto. The bracket 308 is made of metal, for example, and includes a flat plate-shaped base 318, a fixing portion 320, and an extension portion 322. The fixing portion 320 of the bracket 308 is a site extending upward from a vehicle front-rear direction center 324 of the base 318, and a bolt hole 326 is formed therein. The bracket 308 is fixed non-rotatably to the roof side rail 104 of the vehicle body by screwing a bolt 328 or the like into the bolt hole 326.

A first through-hole 330 is formed in the base 318 of the bracket 308. The first through-hole 330 is a horizontally elongated opening part that extends in the vehicle front-rear direction, and by passing the strip-form tab 148d therethrough, the cushion 106A can be suspended from the tab 148d during inflation and deployment.

The extension portion 322 of the bracket 308 extends from a vehicle front-side side end 332 of the base 318 to the side of the predetermined location 312 (see FIG. 12) in the region 302. Further, the extension portion 322 includes a site that projects upward from an upper end 334 of the base 318, and a second through-hole 336 is formed in this site. In other words, the second through-hole 336 is positioned further toward the vehicle front side than the vehicle front-rear direction center 324 of the bracket 308 and provided further toward the upper side than the first through-hole 330.

The second through-hole 336 is a vertically elongated opening part that extends in the vehicle up-down direction, and the strip-form tether 310 is passed therethrough. By passing the tether 310 through the second through-hole 336, the tether 310 can pull the predetermined location 312 of the region 302 toward the vehicle rear side and the vehicle upper side during inflation and deployment (see FIG. 12).

The bracket 308 further includes a hook 338 that is hooked to the roof side rail 104, for example, in the side face upper portion of the vehicle cabin. The hook 338 is a site that projects upward beyond the upper end 334 from a vehicle rear-side side end 340 of the base 318, then extends toward the vehicle outer side, and then bends toward the vehicle lower side.

The curtain airbag device 300 according to this embodiment is provided with the bracket 308, through which the tab 148d that defines the region 302 of the upper portion of the cushion 106A is passed, and the tether 310, which is attached so as to extend from the predetermined location 312 within the region 302 to the bracket 308.

Hence, during inflation and deployment of the cushion 106A, the predetermined location 312 of the region 302 is pulled by the tether 310 attached to the bracket 308. Therefore, with the curtain airbag device 300, downward sagging of the cushion 106A during inflation and deployment can be reduced. Further, when the cushion 106A receives the head 306 (see FIG. 12) of the occupant during a collision, the resulting impact is dispersed by also being transmitted to the bracket 308 via the tether 310. According to the curtain airbag device 300, therefore, the deployment behavior of the upper portion of the cushion 106A can be stabilized, and the head 306 of the occupant can be received and protected sufficiently during a collision.

Furthermore, the first through-hole 330 in the bracket 308 is a horizontally elongated opening part and can therefore contact the strip-form tab 148*d*, which is pulled toward the vehicle lower side during inflation and deployment, along the vehicle front-rear direction. Hence, with the first through-hole 330, force is not exerted locally on the tab 148*d*, and the tab 148*d* can be prevented from shifting to one side in the vehicle front-rear direction.

Moreover, the second through-hole 336 in the bracket 308 is a vertically elongated opening part and can therefore contact the strip-form tether 310, which is pulled toward the vehicle front side and the vehicle lower side during inflation and deployment, along the vehicle up-down direction. Hence, with the second through-hole 336, force is not exerted locally on the tether 310, and the tether 310 can be prevented from shifting to one side in the vehicle up-down direction.

Further, the second through-hole 336 is provided further toward the side of the predetermined location 312 than the vehicle front-rear direction center 324 of the bracket 308. Hence, when the tether 310 passed through the second through-hole 336 is pulled toward the vehicle front side and the vehicle lower side during inflation and deployment, the tether 310 does not catch on a part of the bracket 308. Accordingly, impairment of the behavior of the tether 310 can be prevented, and as a result, the deployment behavior of the upper portion of the cushion 106A can be stabilized.

Moreover, as shown in FIG. 13, the second through-hole 336 is provided on the upper side of the first through-hole 330. During inflation and deployment, therefore, the predetermined location 312 is pulled further toward the vehicle upper side by the tether 310 which, by being passed through the second through-hole 336 provided on the upper side, extends in an almost vertical state. Hence, with the curtain airbag device 300, downward sagging of the cushion 106A during inflation and deployment can be reduced, and the head 306 of the occupant can be received sufficiently even when the head 306 of the occupant behaves so as to sink toward the vehicle lower side relative to the cushion 106A during a collision.

Furthermore, the second through-hole 336 is provided in the extension portion 322 and is therefore positioned further toward the side of the predetermined location 312 than the first through-hole 330 provided in the base 318. Thus, the tether 310 can pull the predetermined location 312 from a position closer to the predetermined location 312, and as a result, the deployment behavior of the upper portion of the cushion 106A can be stabilized even further.

Moreover, the bracket 308 includes the hook 338 that is hooked to the side face upper portion, and therefore the bracket 308 can be fixed to the side face upper portion of the vehicle cabin in a state where the hook 338 is hooked to the roof side rail 104. Hence, the bracket 308 does not rotate during inflation and deployment of the cushion 106A, and as a result, the deployment behavior of the upper portion of the cushion 106A can be stabilized even further.

Figure 14:
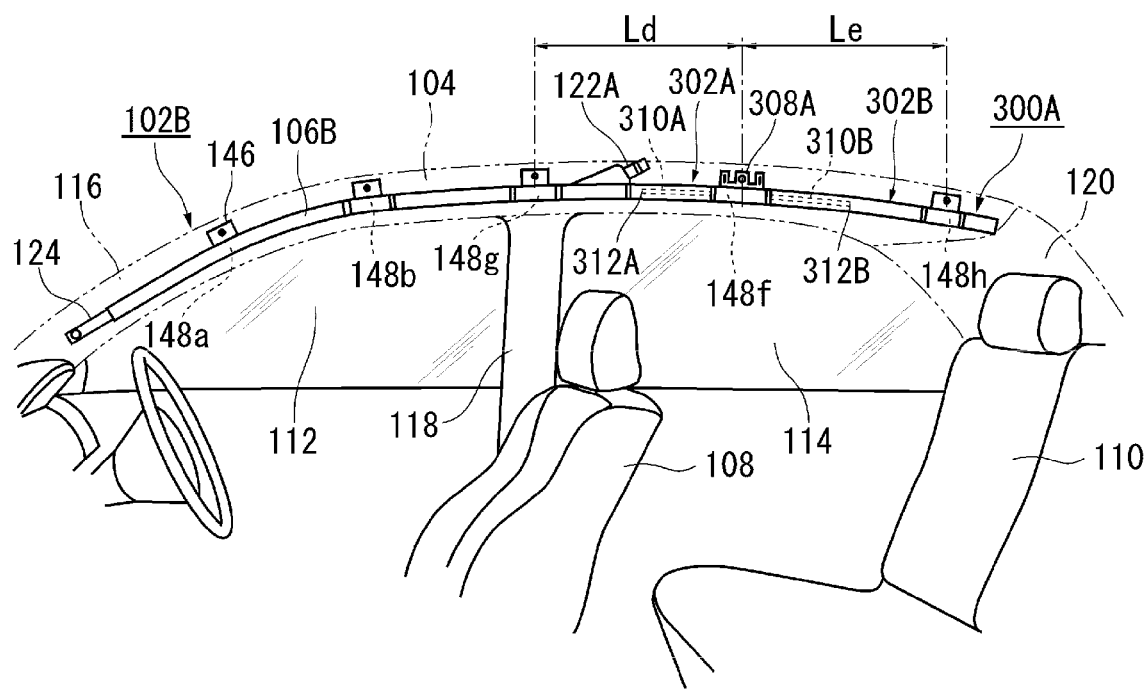
FIG. 14 is a schematic view illustrating a modified example of the curtain airbag device of FIG. 11.
Figure 15:
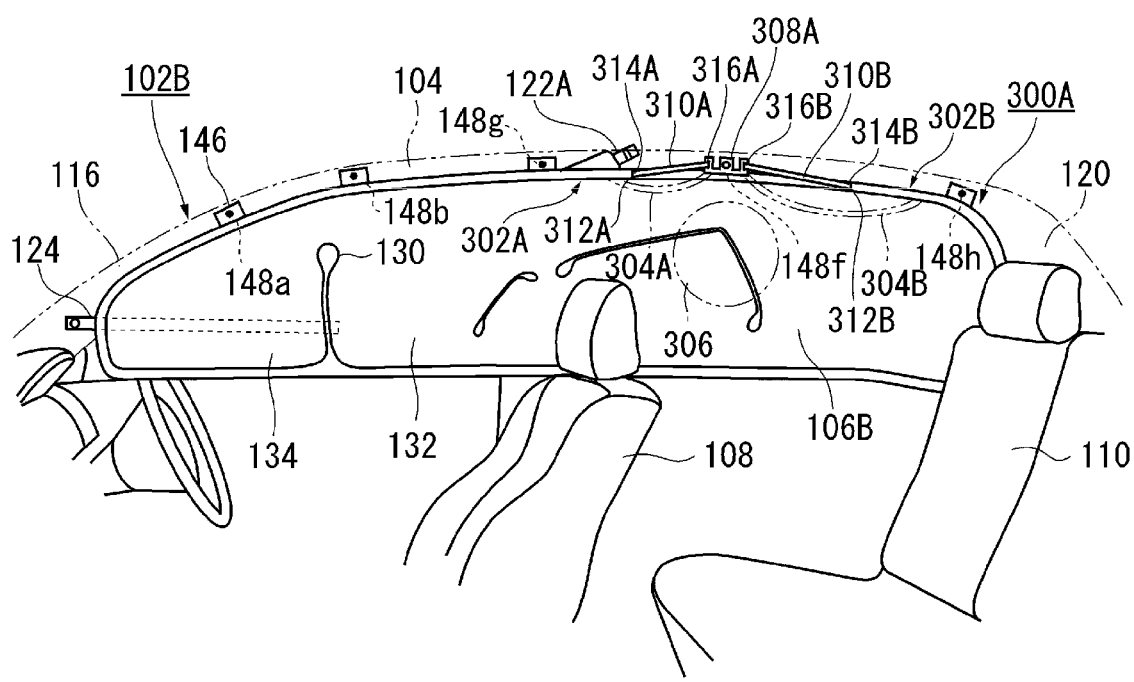
FIG. 15 is a view illustrating the curtain airbag device of FIG. 14 in an inflated and deployed state.

FIG. 14 is a schematic view illustrating a modified example of the curtain airbag device 300 of FIG. 11. FIG. 15 is a view illustrating a curtain airbag device 300A of FIG. 14 in an inflated and deployed state. Note that the curtain airbag device 300A shown in the figures is for use on the right-hand side face of a vehicle 102B, but a left-hand side face curtain airbag not shown in the figures has an identical symmetrical structure.

The curtain airbag device 300A includes a cushion 106B. As shown in the figures, a plurality of tabs 148*a*, 148*b*, 148*f*, 148*g*, 148*h* are attached to an upper portion of the cushion 106B at intervals in the vehicle front-rear direction. Due to the layout of the vehicle 102B, for example attachment positions of an inflator 122A and an assist grip, and so on, the intervals between the adjacent tabs 148*a*, 148*b*, 148*f*, 148*g*, 148*h* may not be constant. As regards the layout of the vehicle 102B, in contrast to the vehicle 102A shown in FIG. 11, a case in which the inflator 122A is attached closer to the center pillar 118 and an assist grip, not shown in the figures, is disposed between the tabs 148*f*, 148*h* is envisaged.

In this case, as shown in FIG. 13, of the intervals between the adjacent tabs 148*a*, 148*b*, 148*f*, 148*g*, 148*h*, an interval Ld between the tab 148*f* (a first tab) and the tab 148*g* (a second tab) and an interval Le between the tab 148*f* and the tab 148*h* (a third tab) are longer than the other intervals. The tabs 148*g*, 148*h* are provided respectively on the vehicle front side and the vehicle rear side of the tab 148*f* serving as the first tab at the respective intervals Ld, Le from the tab 148*f* in the vehicle front-rear direction. Note that in the vehicle 102B, the interval Ld is set to be long because the inflator 122A is positioned between the tab 148*f* and the tab 148*g*, while the interval Le is set to be long because the assist grip is positioned between the tab 148*f* and the tab 148*h*.

Hence, the upper portion of the cushion 106B cannot be fixed to the vehicle 102B over the long intervals Ld, Le in a region 302A between the tabs 148*f*, 148*g* and a region 302B between the tabs 148*f*, 148*h*. As a result, the deployment behavior of the cushion 106B during inflation and deployment is unstable in the regions 302A, 302B of the upper portion of the cushion 106B. Moreover, the regions 302A, 302B are not fixed to the vehicle 102B and therefore sag downward, as shown by imaginary lines 304A, 304B in FIG. 15. Accordingly, locations not covered by the cushion 106B may appear in the side face upper portion of the vehicle cabin, and it is therefore difficult to receive and protect the head 306 (an imaginary line in the figure) of the occupant sufficiently during a collision in the regions 302A, 302B.

Hence, the curtain airbag device 300A is provided with a bracket 308A through which the tab 148*f* serving as the first tab, among the tabs 148*f*, 148*g*, 148*h* defining the regions 302A, 302B, is passed, and two tethers, namely a tether 310A (a first tether) and a tether 310B (a second tether) disposed on respective sides of the bracket 308A. As shown in FIG. 15, the tethers 310A, 310B are attached so as to extend respectively from a predetermined location 312A (a first predetermined location) and a predetermined location 312B (a second predetermined location) positioned respectively within the regions 302A, 302B to the bracket 308A.

The tethers 310A, 310B are strip-form members, and as shown in FIG. 15, are attached by respective leading ends 314A, 314B thereof to the predetermined locations 312A, 312B in the respective regions 302A, 302B in the upper portion of the cushion 106B and by respective rear ends 316A, 316B thereof to the bracket 308A. Note that the other bracket 146 illustrated representatively in the figure is used to attach the cushion 106B to the vehicle 102B, for which purpose only the other tabs 148*a*, 148*b*, 148*g*, and 148*h* are passed therethrough.

Figure 16:
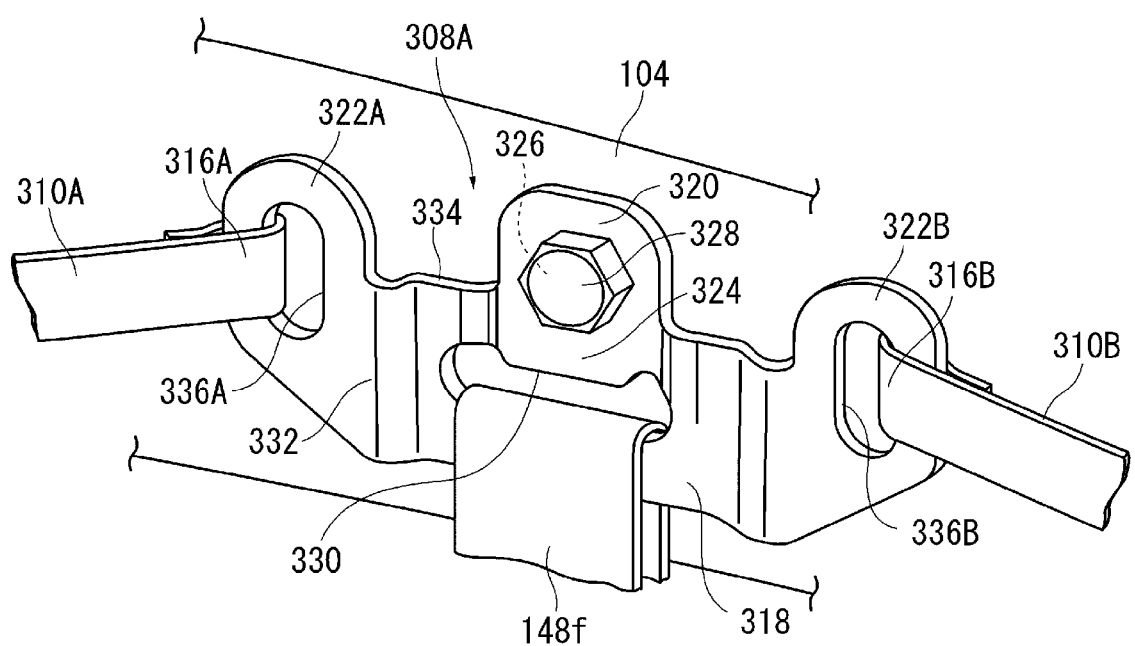
FIG. 16 is a view illustrating a part of the curtain airbag device of FIG. 15.

FIG. 16 is a view illustrating a part of the curtain airbag device 300A of FIG. 15. The figure illustrates the bracket 308A in a state where the tab 148*f* and the tethers 310A, 310B are attached thereto. The bracket 308A differs from the bracket 308 shown in FIG. 13 in that a second through-hole 336A and a third through-hole 336B, through which the strip-form tethers 310A, 310B are respectively passed, are formed therein.

The second through-hole 336A is formed in an extension portion 322A (a first extension portion) of the bracket 308A. The extension portion 322A extends from the base 318 toward the vehicle front side. In other words, the second through-hole 336A is provided further toward the side of the predetermined location 312A (see FIG. 15) of the region 302A than the vehicle front-rear direction center 324 of the bracket 308A. Further, as shown in FIG. 16, the second through-hole 336A is provided on the upper side of the first through-hole 330.

The third through-hole 336B is formed in an extension portion 322B (a second extension portion) of the bracket 308A. The extension portion 322B extends from the base 318 toward the vehicle rear side. In other words, the third through-hole 336B is provided further toward the side of the predetermined location 312B (see FIG. 15) of the region 302B than the vehicle front-rear direction center 324 of the bracket 308A. Further, as shown in FIG. 16, the third through-hole 336B is provided on the upper side of the first through-hole 330.

The second through-hole 336A and the third through-hole 336B are vertically elongated opening parts extending in the vehicle up-down direction, and the strip-form tethers 310A, 310B are passed respectively therethrough. By passing the tether 310A through the second through-hole 336A, the tether 310A can pull the predetermined location 312A of the region 302A toward the vehicle rear side and the vehicle upper side during inflation and deployment (see FIG. 15). Further, by passing the tether 310B through the third through-hole 336B, the tether 310B can pull the predetermined location 312B of the region 302B toward the vehicle front side and the vehicle upper side during inflation and deployment.

The curtain airbag device 300A according to this embodiment is provided with the bracket 308A, through which the tab 148f that defines the regions 302A, 302B of the upper portion of the cushion 106B is passed, and the tethers 310A, 310B, which are attached so as to extend respectively from the predetermined locations 312A, 312B within the regions 302A, 302B to the bracket 308A.

Hence, during inflation and deployment of the cushion 106B, the predetermined locations 312A, 312B of the region 302A, 302B are pulled respectively by the tethers 310A, 310B attached to the bracket 308A. Thus, with the curtain airbag device 300A, downward sagging of the cushion 106B during inflation and deployment can be reduced. Further, when the cushion 106B receives the head 306 (see FIG. 15) of the occupant during a collision, the resulting impact is dispersed by also being transmitted to the bracket 308A via the tethers 310A, 310B. According to the curtain airbag device 300A, therefore, the deployment behavior of the upper portion of the cushion 106B can be stabilized, and the head 306 of the occupant can be received and protected sufficiently during a collision.

Furthermore, the second through-hole 336A and the third through-hole 336B in the bracket 308A are vertically elongated opening parts and can therefore contact the strip-form tethers 310A, 310B, which are pulled toward the front/rear of the vehicle and the vehicle lower side during inflation and deployment, along the vehicle up-down direction. Hence, with the second through-hole 336A and the third through-hole 336B, force is not exerted locally on the tethers 310A, 310B, and the tethers 310A, 310B can be prevented from shifting to one side in the vehicle up-down direction.

Further, the second through-hole 336A and the third through-hole 336B are respectively provided further toward the sides of the predetermined locations 312A, 312B than the vehicle front-rear direction center 324 of the bracket 308A. Hence, when the tethers 310A, 310B passed respectively through the second through-hole 336A and the third through-hole 336B are pulled toward the front/rear of the vehicle and the vehicle lower side during inflation and deployment, the tethers 310A, 310B do not catch on parts of the bracket 308. Accordingly, impairment of the behavior of the tethers 310A, 310B can be prevented, and as a result, the deployment behavior of the upper portion of the cushion 106B can be stabilized.

Moreover, as shown in FIG. 16, the second through-hole 336A and the third through-hole 336B are provided on the upper side of the first through-hole 330. During inflation and deployment, therefore, the predetermined locations 312A, 312B are pulled further toward the vehicle upper side by the respective tethers 310A, 310B which, by being passed respectively through the second through-hole 336A and the third through-hole 336B, extend in an almost vertical state. Hence, with the curtain airbag device 300A, downward sagging of the cushion 106B during inflation and deployment can be further reduced, and the head 306 of the occupant can be received sufficiently even when the head 306 of the occupant behaves so as to sink toward the vehicle lower side relative to the cushion 106B during a vehicle collision.

Furthermore, the second through-hole 336A and the third through-hole 336B are provided in the respective extension portions 322A, 322B and are therefore respectively positioned further toward the sides of the predetermined locations 312A, 312B than the first through-hole 330 provided in the base 318. Thus, the tethers 310A, 310B can pull the predetermined locations 312A, 312B from positions closer to the predetermined locations 312A, 312B, and as a result, the deployment behavior of the upper portion of the cushion 106B can be stabilized even further.

Preferred embodiments of the present invention were described above with reference to the attached figures, but it goes without saying that the present invention is not limited to these examples. It is evident that a person skilled in the art could conceive of various modified or amended examples within the scope of the claims, and it is understood as a matter of course that these modified or amended examples are included in the scope of the claims.

Further, examples in which the curtain airbag device according to the present invention is applied to an automobile were described in the above embodiments, but the curtain airbag device may be applied to an aircraft, a ship, and so on instead of an automobile, with similar actions and effects being obtained as a result.

While the above description constitutes the preferred embodiment of the present invention, it will be appreciated that the invention is susceptible to modification, variation and change without departing from the proper scope and fair meaning of the accompanying claims.

The invention claimed is:

1. A curtain airbag device that is housed in a side face upper portion of a vehicle cabin and inflated and deployed along the side face, the curtain airbag device comprising:
   a main chamber that is inflated and deployed using a gas from an inflator;
   an end chamber that is disposed on a front end of the main chamber and inflated and deployed by the gas received from the main chamber;
   a tab attached to an upper portion of the main chamber;
   a bracket fixed to the side face upper portion of the vehicle cabin, the tab being passed through the bracket; and a tether attached so as to extend from a predetermined location on an upper portion of the end chamber to the bracket, wherein a length of the tether is shorter than a distance from the predetermined location to the bracket in a case where the main chamber and the end chamber are inflated and deployed without the tether.

2. The curtain airbag device according to claim 1 further comprising, the tab and the tether are formed in the shape of strips, and the bracket includes:

a first through-hole extending in a vehicle front-rear direction, through which the tab is passed; and a second through-hole extending in a vehicle up-down direction, through which the tether is passed.

3. The curtain airbag device according to claim 2 further comprising, the second through-hole is provided further toward a side of the end chamber than a vehicle front-rear direction center of the bracket.

4. The curtain airbag device according to claim 2 further comprising, the second through-hole is provided on an upper side of the first through-hole.

5. The curtain airbag device according to claim 2 further comprising, the bracket includes:

a flat plate-shaped base; and a flat plate-shaped bent portion that is bent from a lower end of the base so as to extend toward a vehicle inner side, the first through-hole being provided in the base, and the second through-hole being provided in the bent portion.

6. The curtain airbag device according to claim 1 further comprising, the predetermined location is a front end of the upper portion of the end chamber.

7. The curtain airbag device according to claim 1 further comprising, the predetermined location is the center of the upper portion of the end chamber.

8. The curtain airbag device according to claim 1 further comprising, the bracket includes a hook that is hooked to the side face upper portion.

9. The curtain airbag device according to claim 1 further comprising a strap that is attached so as to extend from a front pillar of the vehicle to a boundary between the main chamber and the end chamber along a vehicle outer side of the end chamber.

10. A curtain airbag device that is housed in a side face upper portion of a vehicle cabin and inflated and deployed along the side face, the curtain airbag device comprising:

an airbag cushion that is inflated and deployed using a gas from an inflator;

a first tab attached to an upper portion of the airbag cushion, and a second tab provided adjacent to the first tab on the upper portion of the airbag cushion at an interval from the first tab in a vehicle front-rear direction;

a bracket fixed to the side face upper portion of the vehicle cabin, the first tab being passed through the bracket; and a first tether attached so as to extend from a first predetermined location between the first tab and the second tab on the upper portion of the airbag cushion to the bracket.

11. The curtain airbag device according to claim 10 further comprising, the bracket includes:

a first through-hole extending in the vehicle front-rear direction, through which the first tab is passed; and a second through-hole extending in a vehicle up-down direction, through which the first tether is passed.

12. The curtain airbag device according to claim 10 further comprising:

a third tab provided at an interval from the first tab in the vehicle front-rear direction on an opposite side to the second tab; and a second tether attached so as to extend from a second predetermined location between the first tab and the third tab on the upper portion of the airbag cushion to the bracket.

13. The curtain airbag device according to claim 12 further comprising, the bracket includes:

a first through-hole extending in the vehicle front-rear direction, through which the first tab is passed;

a second through-hole extending in a vehicle up-down direction, through which the first tether is passed; and a third through-hole extending in the vehicle up-down direction, through which the second tether is passed.

14. The curtain airbag device according to claim 13 further comprising, the second through-hole in the bracket is provided further toward the side of the first predetermined location than a vehicle front-rear direction center of the bracket, and the third through-hole is provided further toward the side of the second predetermined location than the vehicle front-rear direction center of the bracket.

15. The curtain airbag device according to claim 13 further comprising, the second through-hole and the third through-hole are provided on an upper side of the first through-hole.

16. The curtain airbag device according to claim 13 further comprising, the bracket includes:

a flat plate-shaped base;

a first extension portion extending from the base to the side of the first predetermined location; and a second extension portion extending from the base to the side of the second predetermined location, the first through-hole being provided in the base, the second through-hole being provided in the first extension portion, and the third through-hole being provided in the second extension portion.

17. The curtain airbag device according to claim 10 further comprising, the bracket includes a hook that is hooked to the side face upper portion.

* * * * *